United States Patent
Collins et al.

(10) Patent No.: US 7,100,034 B2
(45) Date of Patent: Aug. 29, 2006

(54) SYSTEM FOR SELECTING ANOTHER PROCESSOR TO BE THE BOOT STRAP PROCESSOR WHEN THE DEFAULT BOOT STRAP PROCESSOR DOES NOT HAVE LOCAL MEMORY

(75) Inventors: David L. Collins, Magnolia, TX (US); Steven R. Dupree, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 10/444,450

(22) Filed: May 23, 2003

(65) Prior Publication Data

US 2004/0236935 A1    Nov. 25, 2004

(51) Int. Cl.
*G06F 9/00* (2006.01)

(52) U.S. Cl. .............. 713/1; 713/2; 713/375; 713/300; 713/400

(58) Field of Classification Search ........... 713/1, 713/2
See application file for complete search history.

(56) References Cited

U.S. PATENT DOCUMENTS

| | | | |
|---|---|---|---|
| 5,448,716 A * | 9/1995 | Hardell et al. | 713/375 |
| 5,790,850 A * | 8/1998 | Natu | 713/2 |
| 5,835,784 A * | 11/1998 | Gillespie et al. | 710/10 |
| 5,860,002 A | 1/1999 | Huang | |
| 6,009,521 A | 12/1999 | Huang | |
| 6,108,781 A * | 8/2000 | Jayakumar | 713/2 |
| 6,178,445 B1 * | 1/2001 | Dawkins et al. | 709/209 |
| 6,314,501 B1 * | 11/2001 | Gulick et al. | 711/153 |
| 6,336,185 B1 * | 1/2002 | Sargenti et al. | 713/2 |
| 6,584,560 B1 * | 6/2003 | Kroun et al. | 713/2 |
| 6,601,165 B1 * | 7/2003 | Morrison et al. | 713/2 |
| 6,754,828 B1 * | 6/2004 | Marisetty et al. | 726/2 |
| 6,785,892 B1 * | 8/2004 | Miller et al. | 719/313 |
| 6,907,521 B1 * | 6/2005 | Saw-Chu et al. | 713/1 |
| 6,917,999 B1 * | 7/2005 | Kumar et al. | 710/302 |
| 6,925,556 B1 * | 8/2005 | Hill et al. | 713/1 |

* cited by examiner

*Primary Examiner*—Thomas Lee
*Assistant Examiner*—Sean Weinman

(57) ABSTRACT

A plurality of processors are coupled together. One of the processors may comprise a default boot strap processor ("BSP"). Further, the default BSP may determine whether the BSP has local memory and becomes the BSP for the system if the default BSP has local memory, or selects another processor to be the BSP for the system if the default BSP does not have local memory.

17 Claims, 2 Drawing Sheets

SYSTEM FOR SELECTING ANOTHER PROCESSOR TO BE THE BOOT STRAP PROCESSOR WHEN THE DEFAULT BOOT STRAP PROCESSOR DOES NOT HAVE LOCAL MEMORY

BACKGROUND

1. Field of the Invention

The present invention generally relates to the selection of a boot strap processor in a multi-processor environment.

2. Background Information

Some computer systems include more than one processor and each processor may have its own local memory. In multi-processor systems, typically, one of the processors comprises the "boot strap processor" ("BSP"). The BSP may be responsible for, among other activities, various initialization activities such as initializing input/output ("I/O") subsystems, initializing user interfaces, and causing the operating system to be loaded on the various processors in the system. To perform the activities of a BSP, the BSP generally requires access to memory. If memory is not installed for the BSP, the system may fail to initialize correctly and/or may "crash."

BRIEF SUMMARY OF EMBODIMENTS OF THE INVENTION

In accordance with at least some embodiments, a plurality of processors are coupled together. One of the processors may comprise a default boot strap processor ("BSP"). Further, the default BSP may determine whether the BSP has local memory and becomes the BSP for the system if the default BSP has local memory, or selects another processor to be the BSP for the system if the default BSP does not have local memory.

BRIEF DESCRIPTION OF THE DRAWINGS

For a detailed description of the exemplary embodiments of the invention, reference will now be made to the accompanying drawings in which.

NOTATION AND NOMENCLATURE

Certain terms are used throughout the following description to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
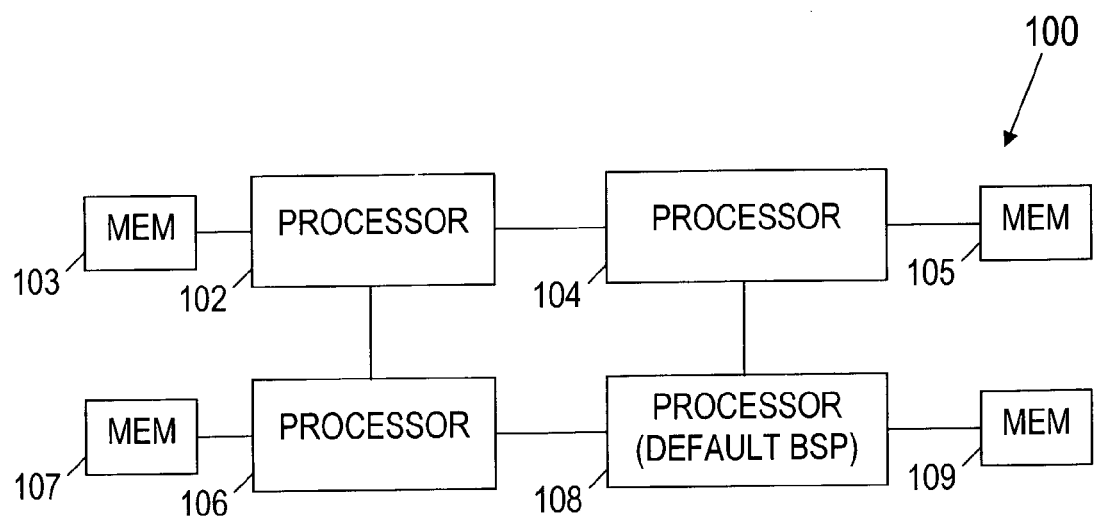
FIG. 1 shows an exemplary system having four processors in which one of the processors is a default boot strap processor and the boot strap processor includes local memory.

Referring now to FIG. 1, an electronic system 100 may comprise a plurality of processors 102, 104, 106, and 108. The system 100 may be representative of a wide variety of systems, such as, without limitation, a computer. Although four processors 102–108 are shown in the exemplary embodiment of FIG. 1, in general, any number of processors may be included in the system. Each processor may have local memory 103–109 as shown associated with that processor. Thus, processor 102 may have memory 103, while processors 104, 106 and 108 may have local memory 105, 107, and 109, respectively. Each memory 103–109 may be of the same or different capacity than the other memories. Other devices (not specifically shown) may be included as well and coupled to one or more of the processors and may include, without limitation, one or more input/output ("I/O") devices such as a keyboard, mouse, display, network interface controller.

As shown in FIG. 1, one of the processors 102–108 may be designated the default BSP (processor 108). This designation may be based on the location of the processors within the system. For example, the BSP may be whichever processor is electrically connected or coupled to the system's bridge device (e.g., "south" bridge), if such a device is included in the system. If, in fact, the default BSP (regardless how the default BSP is determined or selected) has its own local memory, then that processor may be permitted to function as the default BSP for the system.

Figure 2:
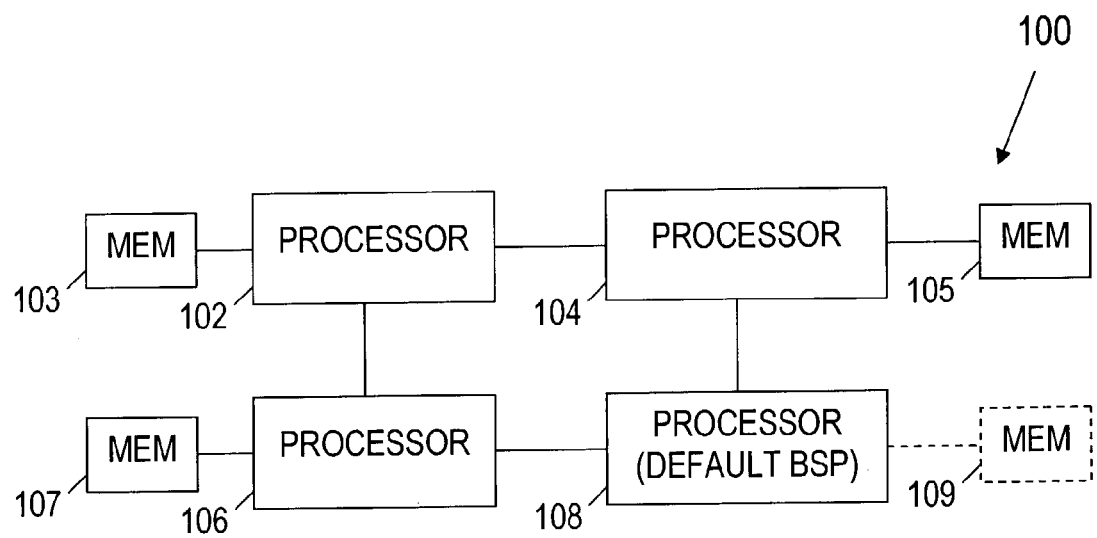
FIG. 2 shows an exemplary system in which the boot strap processor does not have local memory.

FIG. 2 shows system 100 in which the default BSP 108 does not have any local memory 109, as indicated by the dashed box around memory 109. In this situation, another processor 102–106 may be selected to function as the BSP for the system. In some embodiments, of the remaining processors 102–106 that have local memory, the processor 102, 104, 106 that has the largest complement of local memory 103, 105, 107 may be selected to be the BSP.

Figure 3:
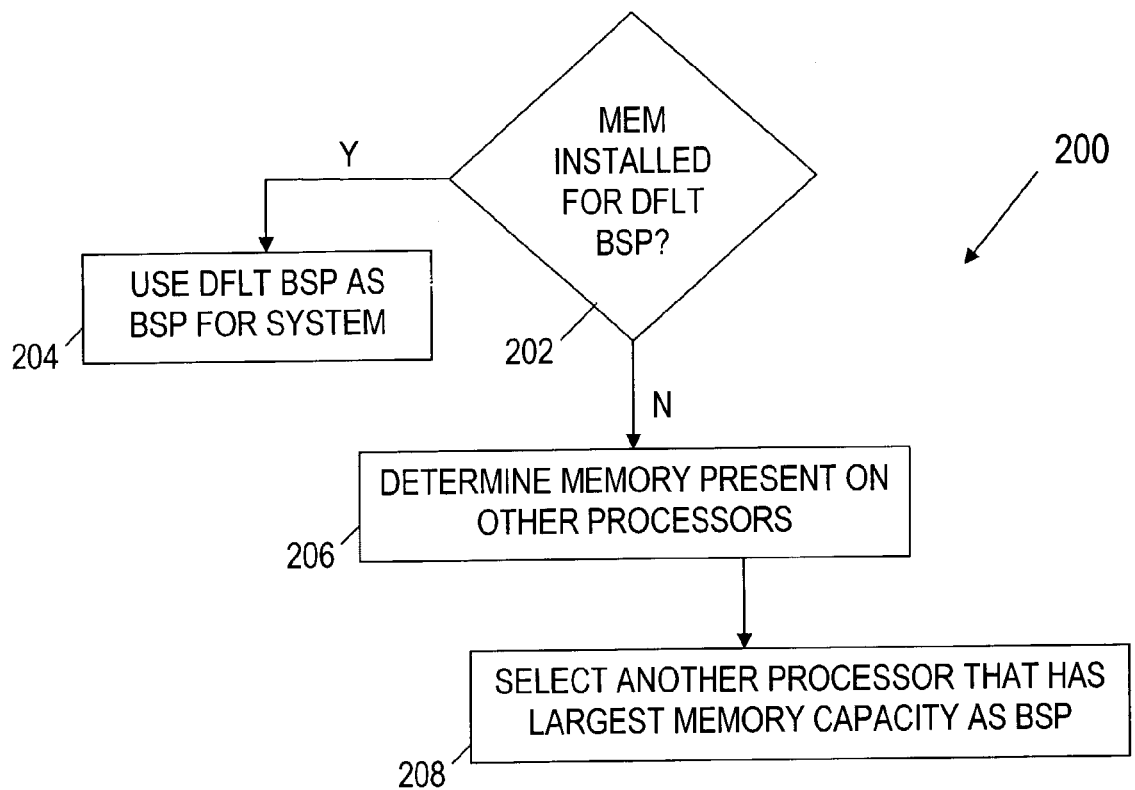
FIG. 3 shows a flowchart of a process for selecting a boot strap processor in accordance with various embodiments of the invention.

FIG. 3 provides an example of this process for selecting a BSP. As shown in FIG. 3, process 200 includes blocks 202–208. In decision block 202, it is determined whether memory is installed on the default BSP. This determination can be readily made by the default BSP 108 itself. If the default BSP has local memory, then that processor is used as the BSP in block 204. If, however, the default BSP does not have local memory, then it may be determined which of the other processors in the system have local memory (block 206). In block 208, the processor that has the largest memory capacity may be selected as the BSP.

Blocks 206 and 208 may be implemented in a variety of ways. In some embodiments, the default BSP may interrogate individually each of the other processors in the system for information regarding their local memory. In response, each processor may report whether it has local memory and, if so, how much local memory is present. The default BSP may use that information to select as the BSP for the system the processor that reports the largest amount of memory. In other embodiments, each processor in the system may determine whether it has local memory and, if so, the quantity of local memory without being prompted for such information by the default BSP. The results of each processor determining its own local memory may be related to the default BSP via any of a variety of techniques such as by setting flags indicative of the amount of local memory. Rather than individually prompting each processor to determine and report its local memory, the default BSP may read and process the flags.

In other embodiments of the invention, even if the default BSP 108 includes local memory, the processor 102–108 with the most local memory 103–109 in the system may be used as the default BSP. The default BSP may be used as the BSP if it has more memory than the other processors in the system, or may select another processor that has the most local memory to be the BSP.

In at least some situations, it may be possible for two or more processors to have an equal amount of memory that is larger than all other processors in the system. In this situation, as between the two or more processors having the most local memory in the system, a processor is selected to be the BSP that comports with any one of a variety of suitable criteria. For instance, each processor may be assigned a unique numerical or alphanumerical identifier (e.g., serial number) and the processor with identifier that ranks above the other processors may be selected as the BSP. The ranking may be based on the size of the identifier such that the largest, or smallest, identifier is selected as the BSP. The ranking may be based on examining a portion of the identifier and ranking them according to size. Further still, a mathematical formula or algorithm may be applied to the unique identifiers to generate another sortable value that is then used to select a BSP. Numerous other criteria may be implemented as well.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of processors coupled together, wherein one of the processors comprises a default boot strap processor ("BSP"); and
wherein the default BSP determines whether the BSP has local memory and becomes the BSP for the system if the default BSP has local memory, or selects another processor to be the BSP for the system if the default BSP does not have local memory.

2. The system of claim 1 wherein, of other processors that have local memory, the default BSP selects such other processor that has a largest amount of memory as the BSP for the system.

3. The system of claim 1 wherein the default BSP interrogates all other processors to determine which other processors have local memory and amount of such local memory.

4. The system of claim 1 wherein the system comprises a computer.

5. A computer, comprising:
a plurality of processors in communication with each other wherein one of the processors comprises a default boot strap processor ("BSP"); and
wherein the default BSP determines which of the plurality of processors in the system has a largest amount of local memory and causes that processor to be the BSP for the system.

6. The computer of claim 5 wherein if two or more processors have an equal amount of memory which is more than the memory in the other processors, one of the processors having the equal amount of memory is selected as the BSP based on a criteria.

7. The computer of claim 6 wherein each processor includes a unique numerical identifier and the criteria includes the processor with a highest ranking identifier.

8. The computer of claim 6 wherein each processor includes a unique numerical identifier and the criteria includes the processor with a lowest ranking identifier.

9. The computer of claim 6 wherein each processor includes a unique identifier from which a value is mathematically generated, and the criteria is based on said value.

10. The computer of claim 5 wherein the default BSP interrogates all other processors to determine which other processors have local memory and a amount of such local memory.

11. A method of selecting a boot strap processor ("BSP") in a system having a plurality of processors, comprising:
determining whether a default BSP has local memory; and
permitting the default BSP to be the BSP for the system
if the default BSP has local memory; or
if the default BSP does not have local memory, determining which of the other processors has local memory and selecting another processor that has local memory to be the BSP for the system.

12. The method of claim 11 wherein determining which of the other processors has local memory includes determining which processor has more memory than the other processors and selecting that processor to be the BSP for the system.

13. The method of claim 11 wherein determining which of the other processors has local memory includes individually interrogating each of the other processors to determine whether such other processor have local memory and quantity of memory.

14. The method of claim 1 wherein determining which of the other processors has local memory includes each of the other processors concurrently determining how much local memory each such other processor has and setting a flag to be read by the default BSP indicative of the amount of local memory.

15. A system, comprising:
a plurality of processors coupled together including a default boot strap processor ("BSP"); and
a means for determining whether the default BSP has local memory and, if so, for causing the default BSP to be the BSP for the system, or for selecting another processor to be the BSP for the system if the default BSP does not have local memory.

16. The system of claim 15 further including a means for communicating with the other processors to determine which other processors have local memory and amount of such local memory.

17. The system of claim 16 further including a means for selecting the processor that has the most local memory to be the BSP for the system.

* * * * *

UNITED STATES PATENT AND TRADEMARK OFFICE
CERTIFICATE OF CORRECTION

PATENT NO. : 7,100,034 B2
APPLICATION NO. : 10/444450
DATED : August 29, 2006
INVENTOR(S) : David L. Collins et al.

Page 1 of 1

It is certified that error appears in the above-identified patent and that said Letters Patent is hereby corrected as shown below:

In column 4, line 25, in Claim 10, after "and" delete "a".

Signed and Sealed this

Fourteenth Day of April, 2009

JOHN DOLL
*Acting Director of the United States Patent and Trademark Office*